July 1, 1952          E. C. GISIN          2,601,948
ELECTRIC DYNAMO WINDING CALCULATOR
Filed Dec. 31, 1948          3 Sheets-Sheet 2
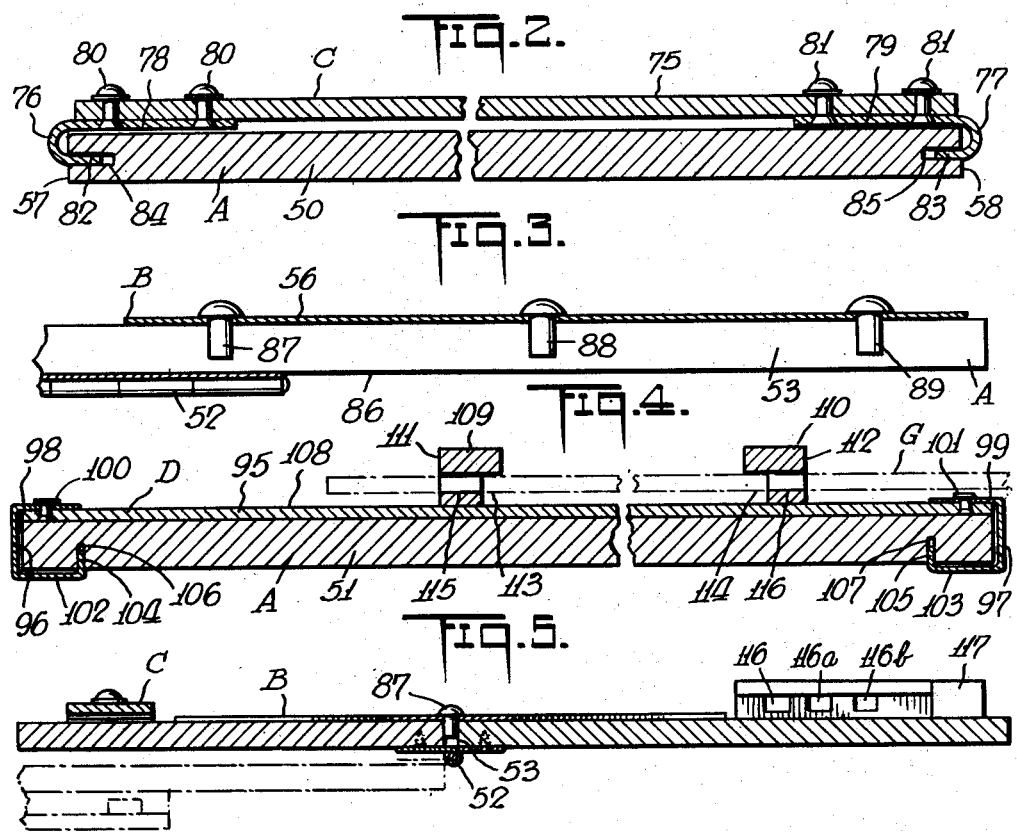
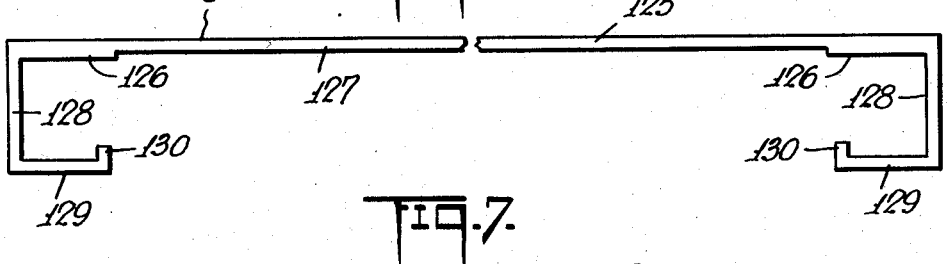
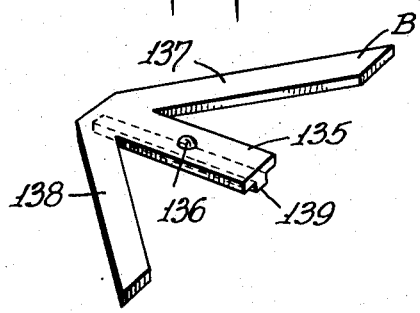
INVENTOR
Edward C. Gisin
BY
ATTORNEY July 1, 1952 E. C. GISIN 2,601,948
ELECTRIC DYNAMO WINDING CALCULATOR
Filed Dec. 31, 1948 3 Sheets-Sheet 3
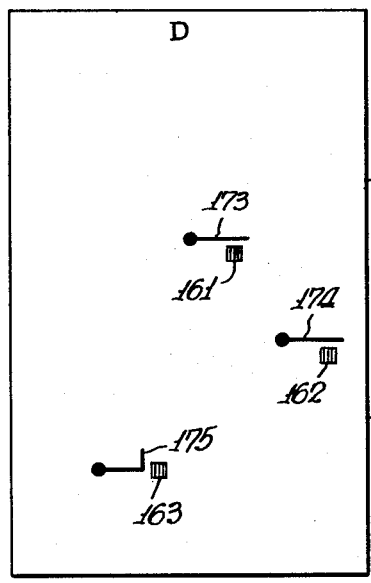
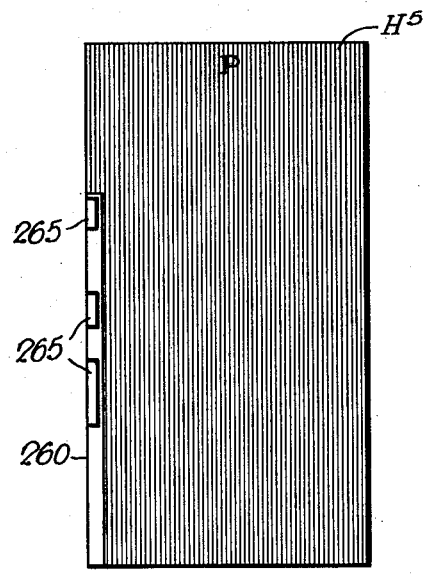
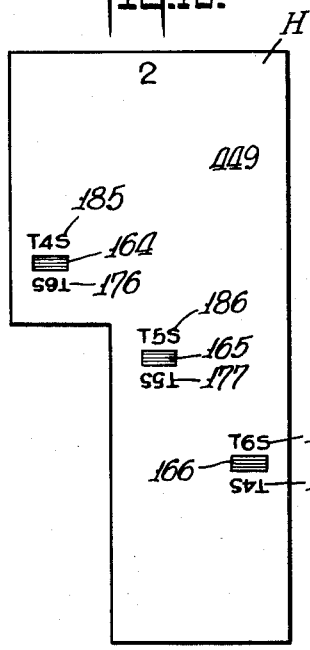
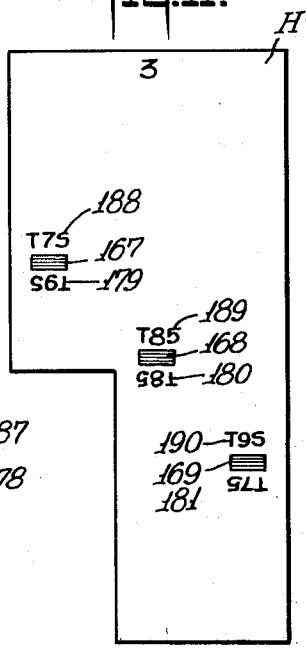
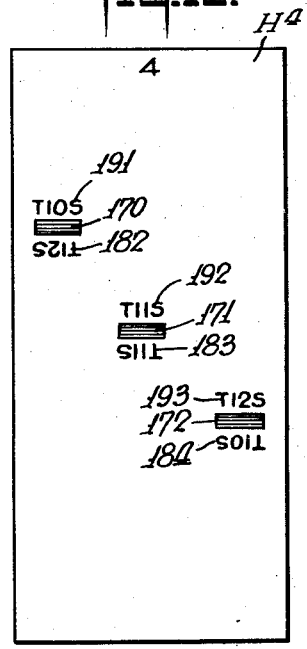
INVENTOR
*Edward C. Gisin*
BY
ATTORNEY Patented July 1, 1952

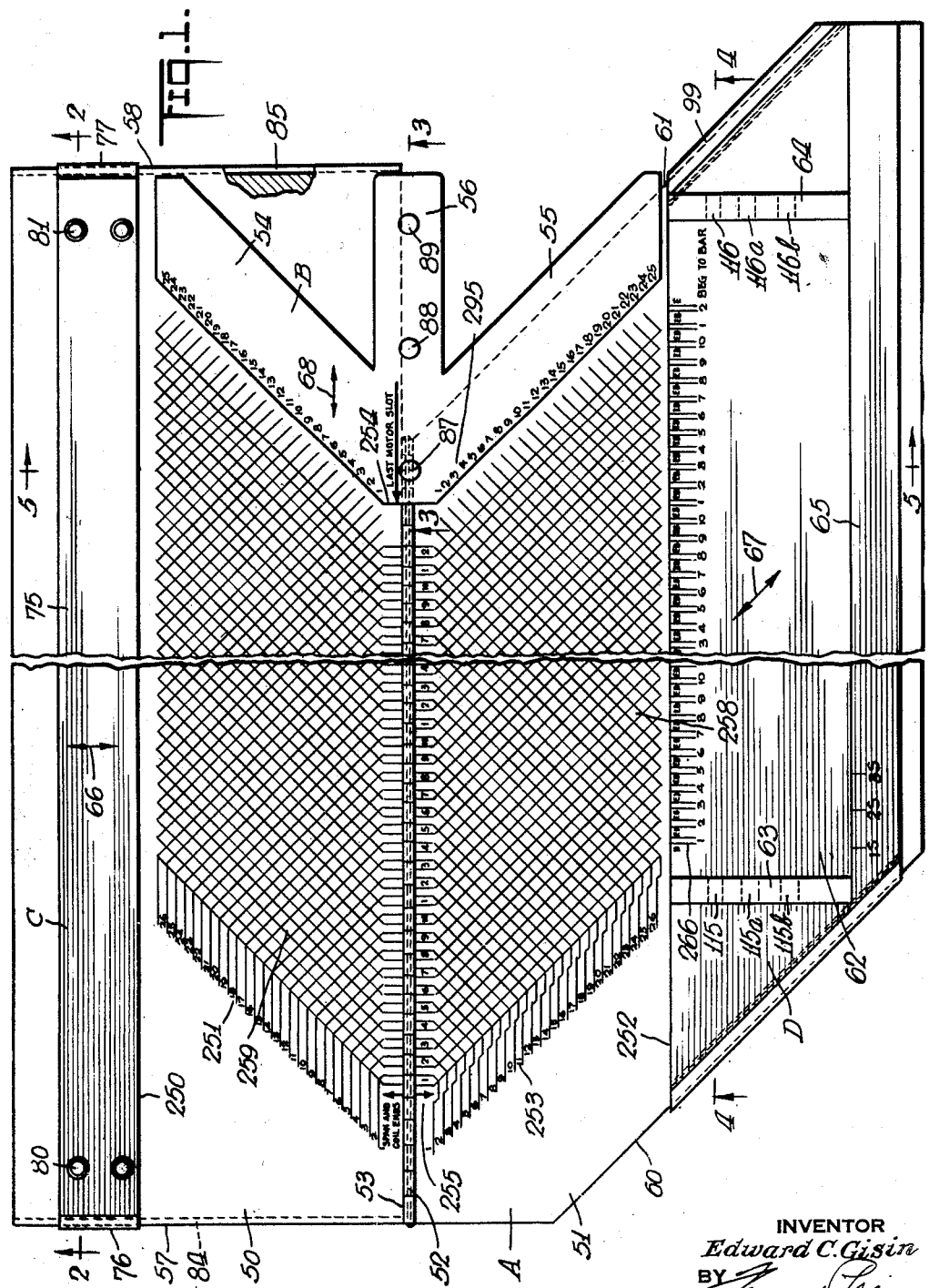

2,601,948

UNITED STATES PATENT OFFICE 2,601,948

ELECTRIC DYNAMO WINDING CALCULATOR

Edward C. Gisin, Hasbrouck Heights, N. J.

Application December 31, 1948, Serial No. 68,608

12 Claims. (Cl. 235—61)

The present invention relates to an electric dynamo winding calculator, and it particularly relates to a simplified calculator arrangement which will readily enable winding of alternating or direct current motors or generators of widely varying characteristics.

It is among the objects of the present invention to enable students, apprentices and mechanics by simple manipulation of a multi-chart calculator to determine the proper method of winding an electric motor or generator for either alternating or direct current which will give ready ascertainment of the span, the motor slots and the various types of connections.

It is also among the objects of the present invention to provide a simplified, inexpensive, readily utilized, electrical motor or generator winding calculator which by relatively simple settings and easy adjustment will enable accurate and relatively rapid winding of motors and generators and of stators, rotors and armatures without the necessity of major calculation and preparation and use of complicated and expensive charts, blueprints and designs.

A still further object is to give a simplified electric winding calculator with high visibility and in which the layout or proper development may be completed or changed in a few seconds, which may be used by mechanics, apprentices, students, instructors or those skilled in the winding field, which may be varied in size from convenient pocket size to large blackboard size, and which is particularly useful for instruction in trade schools.

In winding a motor or generator the winding will vary depending upon the following conditions:

(I) voltage;
(II) speed or number of poles;
(III) current;
(IV) number of slots;
(V) span or pitch, which is number of slots a coil will by-pass before again entering a slot;
(VI) in case of three phase whether
   (a) series-star or series-delta
   (b) whole coil, half coil or consequent
   (c) parallel or series
(VII) in case of direct current whether wave wound or lap wound which may be simplex, duplex or triplex windings, whether one, two or three elements per slot, and which may be singly or doubly re-entrant;
(VIII) number of coils per group.

Normally in winding a motor or generator, the winding is applied to either the stator or rotor receiving the winding which is slotted to receive the turns which move up the coil or coils.

The coils are usually prefabricated by taking the necessary size of wire and winding it upon a form or jig until the desired number of turns is provided. Then the coil is taped wholly or partially and cut to give the two ends.

These coils are then ready to be laid into the stator or rotor after application of proper insulation. The coils always are installed with the turns all in the same direction.

After the coils are inserted they are connected into groups. The end of the first coil connects to the beginning of the second until the desired number of coils form a group.

Essentially the calculator consists of a baseboard which may be hinged for collapsing to give compactness in shipment and storage. This board is graduated with a series of transversely crossing equally spaced lines at angles of 45° which are separated in two groups and connected by vertical markings indicating motor slots.

There are sufficient lines and slots indicated in the preferred embodiment to provide for 72 slots which will take care of most general winding problems. If desired the board could be extended up 180 to 400 or more slots as may be needed in special cases.

Sliding vertically across the upper part of the baseboard is a straight end, the bottom edge of which will indicate the desired span line upon the upper group of 45 degree graduations. The span line will vary with increased or decreased spacing between the slots. The smaller the slot spacing the closer the straight end will be toward the center of the calculator and the larger the slot spacing the farther straight edge is away from the center of the calculator.

Horizontally across the board preferably is a central groove extending transversely across the slot lines.

Sliding in this groove is an arrow-head shaped slot indicator which is moved up to blank out all slots except those corresponding to the actual number available. On this triangular slider will be indicated the coil ends which may go up to 25 or 36 as desired. Normally there will be two coil ends for each coil and the number of coils will vary depending upon the number of coil sides per slot. The head of the arrow slider is set between the last and the next higher slot wanted.

At the left edge of the 45° graduations on the baseboard or base chart there will be short horizontal extension lines which both indicate span or pitch and coil ends.

Moving vertically across the lower set of graduations is a slider member which moves in a 45° direction. The top edge of this slider member gives the span on the lower half of the graduations and it also carries a series of auxiliary members which enable the user of calculator to determine the number of even or odd coils per groups for direct current or alternating current winding, for either lap or wave wound direct current armatures such as those having one, two or four coil sides per slot, together with one, two or three elements per slot, for three phase star or delta connections whether series two, three or four parallel, connections for two speed three phase motor connections, for whole coil or half coil three phase alternating connections, for consequent pole three phase alternating connections and so forth.

The invention also consists in certain new and original features of construction and combination of parts, hereinafter set forth and claimed and as to its other objects, features and advantages, the mode of operation and manner of its organization, these may be better understood by referring to the following description considered in connection with the accompanying drawings forming a part thereof, in which:

Fig. 1 is a top plan view of the calculator showing the base board in extended position and with the laterally moving motor slot locator, the vertically moving straight edge, and the pocket unit slider, all positioned off the chart, the board being centrally broken away to enable saving in space.

Fig. 2 is a transverse vertical sectional view upon the line 2—2 of Fig. 1, upon an enlarged scale as compared to Fig. 1, also broken away to shorten the same.

Fig. 3 is a transverse vertical sectional view upon the line 3—3 of Fig. 1, and upon an enlarged scale as compared to Fig. 1, also broken away to shorten the same.

Fig. 4 is a transverse vertical sectional view upon the line 4—4 of Fig. 1, and upon an enlarged scale as compared to Fig. 1, also broken away to shorten the same.

Fig. 5 is a transverse vertical sectional view upon the line 5—5 of Fig. 1, and upon an enlarged scale as compared to Fig. 1, with the height of the calculator somewhat shortened for economy of space.

Fig. 6 is a side elevational view of an alternative form of sliding straight edge consisting of a one-piece, molded construction.

Fig. 7 is a top perspective view of an alternative one-piece, molded, laterally moving slot locating slider.

Fig. 8 is a top plan view of a clear shield to be placed in the extreme left end of the pocket slider on top of the wide extension strip and narrow adaptor strip already placed in the pocket of the slider for the purpose of changing a series or parellel star connection to a series or parallel delta connection.

Fig. 9 is a top plan view of an opaque shield to be placed on the same inserts to alter, by-pass and complete the circuit in question.

Figs. 10, 11 and 12 are top plan views of transparent or clear shields for the purpose of changing either the series star or series delta into a 2, 3 or 4 parallel of either circuit.

In the following description of the invention, it may be well first to define the manner in which each of the phrases and terms are utilized in connection with the present calculator:

(a) Poles—number of magnetic poles is governed by winding and varies from 2 to 48;

(b) Phases—number of alternating voltage sine waves spaced equally angularly apart varying from 1 to 12 usually three in number;

(c) Coils—the turns of wires or conductors which form a magnetic pole;

(d) Groups—the collection of coils collected together and placed in a slot to form a magnetic pole;

(e) Whole coil connection—all the ends of a coil group connected to the ends of next coil group of same phase with the beginnings to the beginnings;

(f) Half coil connection—the same as a whole connection except that end of first coil group connects to beginning of the next group of the same phase;

(g) Pitch or span is the number of slots spanned by number of turns in a coil of wire;

(h) Slots—are cut into stator or rotor to receive the coils of wire;

(i) Constant H. P. is where horsepower of motor is constant at all speeds;

(j) Constant torque where pulling power is constant at all speeds;

(k) Alternate pole is where the connections between pole groups skip one pole and connect to following pole;

(l) Consequent pole is where the connection is similar to a half coil except that in doing so the number of poles are doubled as in a whole coil connection.

(m) Lap wound both alternating and direct current—A winding where all coils that form a pole group (coils that are joined together to form a group) in which the circuit can be traced through all coils before leaving that group and generally speaking in a broad sense where the coil ends return near a point adjacent to the beginning lead of that coil.

(n) Wave wound both alternating and direct current—A winding which the circuit is traced through only one coil in each pole group before leaving that group and generally speaking where the coil ends are connected at such points widely separated from the same beginning of that coil.

(o) A simplex winding direct current—A simplex winding is when the beginning and end of a specific coil connect to adjacent commutator bars, e. g. the end of the first coil will connect to the same commutator as the beginning of the second coil and all coils follow in the same order. Brushes are 1 bar wide.

(p) A duplex winding direct current—a duplex winding is when the end of the first coil connects to the third commutator bar and all coil leads follow in order. Brushes are 2 bars wide.

(q) A triplex winding direct current—A triplex winding is when the end of the first coil connects to the fourth commutator bar and all coil leads follow in order. Brushes are 3 bars wide.

(r) A singly reentrant winding direct current—A winding where the circuit is traced once around the armature and then comes back to its starting point.

(s) A doubly re-entrant winding direct current—A winding where the circuit is traced twice around the armature and then traces back to the original starting point.

(t) Star connection alternating current—A connection where the three main ends of phase windings are connected together to form a common point, called a common star point.

(u) Delta connection alternating current—A connection where the last end of phase A or number 1 connects to the beginning of phase C or number 2. The last end of phase C or number 2 connects to the beginning of phase B or number 3. The last end of phase B or number 3 connects to the beginning of phate A or number 1.

(v) By word "dynamo" is included direct or alternating current motors or generators which latter may also be known as alternators.

(w) In direct current windings there can be one, two or three elements or core per slot requiring respectively two, four and six commutator bars. This applies to both lap and wave windings.

Generally the device of the present invention is applicable to the winding of stators or rotors of alternators or alternating current motors and also to the armatures of direct current motors and generators.

It has been found most satisfactory to form the calculator of (a) a single base board A which may be centrally split and hinged to carry the developed winding (Fig. 1);

(b) a laterally moving motor slot locater B (Fig. 1) to fix the total number of motor slots, which may be mounted so as to slide along a central horizontal slot or hinge of the base board A;

(c) a vertically moving straight edge C (Fig. 1) preferably positioned on the upper part of the base board to locate the span or pitch on the upper half of the board;

(d) a pocket unit slider D (Fig. 1) designed to slide obliquely at a 45° angle on the lower half of the split base board A, which will locate the span or pitch.

The face of the main hinged or split chart board A (Fig. 1) may be made of white plastic or metal with black lines, numbers, wordings and arrows, with the hinge slot extending horizontally across the board about midway thereof. This hinge permits folding to a more compact size, and if desired it may be omitted.

Upon the main chart board are positioned at 45° angles a plurality of lines to indicate the rotor or stator coils or armature coils in a developed wiring diagram for a motor, generator or alternator.

In a typical calculator provision may be made for 72 motor slots. In such case, the calculator may be adjusted for any number of slots from 1 to 72. However, the calculator may be reduced to 36 slots or increased to 180 to 400 slots.

At the extreme left side of the chart A (Fig. 1) a series of horizontal lines may be provided to show the pitch or span of the winding, which lines will also represent the coil ends of the developed wiring diagram.

The straight edge or upper vertically sliding element C (Fig. 1) may be moved so that its bottom edge rests upon any span which is called for by the pitch formula.

The laterally sliding slot locator element B (Fig. 1) may take a form similar to that of an arrowhead and by its adjustment will indicate the number of motor slots for any particular winding.

The top edge of the pocket slider D will give the pitch or span on the lower half of the chart.

The pocket slider D of Fig. 1 will graduate at its upper edge with a series of lines representing coil leads and it will carry three double-face wiring diagrams E (Figs. 13 to 24) and three double-face wiring adaptors F (Figs. 25 to 37) at a time together with five shields H (Figs. 8 to 12).

The shields H (Figs. 8 to 12) are made of four clear squares or rectangles of transparent glass or plastic and one of opaque glass or plastic which last mentioned shield (Fig. 9) is left clear at the extreme left edge.

One of transparent shields $H^1$ (Fig. 8) will change the circuit arrangement from series star to series delta.

Another of the transparent shields $H^2$ (Fig. 10) will change a series Y or series delta circuit arrangement to a two parallel connection.

To obtain a three parallel connection a third transparent shield $H^3$ (Fig. 11) is employed together with shield $H^2$ (Fig. 10).

The fourth transparent shield $H^4$ (Fig. 12) in conjunction with shields $H^2$ and $H^3$ changes the circuit from a series Y or delta circuit arrangement to a four parallel arrangement.

The opaque shield $H^5$ (Fig. 9) gives the number of poles required. The shield $H^5$ will blank out groups of connections on the diagram strips E and will show a by-passing circuit arrangement.

The shields $H^1$, $H^2$, $H^3$ and $H^4$ (Figs. 8, 10, 11 and 12) have small square white blocks 161 to 172 to block out or discontinue parts of the circuits on the diagram strips E. Shields $H^1$ and $H^5$ carry black circuit connection lines 173, 174, 175 and 265 which join the circuits otherwise interrupted on the diagram strips E by the shields $H^1$ and $H^5$.

The shields $H^2$, $H^3$ and $H^4$ each have three white or opaque rectangles 164 to 172 to block out part of the circuits on the diagram strips E.

These shields $H^2$, $H^3$ and $H^4$ also carry three sets of black markings 176 to 184 and three sets of red markings 185 to 193 to show the ends and the beginnings of the same circuit. These shields $H^2$, $H^3$ and $H^4$ may be turned around by 180° to have either the red or black markings match the varying circuit lines on the diagram strips E.

Referring to Fig. 1, there is a base board A having an upper half 50 and a lower half 51. Connecting the halves 50 and 51 is a hinge connection 52, between which is a guide groove 53. The groove 53 carries or guides the arrow-shaped, laterally moving motor slot locator member B.

The member B has an upper 45° angle arm 54, a lower 45° arm 55 and a rear extension 56. The upper part of the board has the side edges 57 and 58 and it receives the vertical slider C.

The lower half of the board has the oblique side edges 60 and 61 and it receives the pocket unit slider D.

The pocket unit slider D has a pocket 62 formed by the side members 63 and 64 and the bottom member 65. The straight edge member C is designed to slide as indicated by the double-headed arrow 66. The pocket slider member is designed to slide as indicated by the double-headed arrow 67. The slot locator member B is designed to slide as indicated by the double arrow 68.

Referring to Fig. 2, the straight edge member C has an elongated ruler member 75 which is attached to the U-shaped brackets 76 and 77. The upper flanges 78 and 79 of the brackets 76 and 77 are riveted at 80 and 81 to the bars 75. The inturned edges 82 and 83 fit in the slots 84 and 85 in the edges 57 and 58 of the upper section 50 of the hinged base or chart board A.

Referring to Fig. 3, the hinge 52 is at the bottom face 86 of the board A. The groove 53 is wide enough tightly to clamp the rivets 87, 88 and 89, which are mounted on the central portion 56 of the element B.

The pocket unit slider D is best shown in Figs. 4 and 5 and it has a straight, flat member 95. The member 95 has the side engagement members 96 and 97 having the top elements 98 and 99. The top elements 98 and 99 are held down by the pins or rivets 100 and 101 with the inturned bottom flanges 102 and 103.

The flanges 102 and 103 have the upturned inside flanges 104 and 105 which fit in the slots 106 and 107. Upon the face 108 of the member 95 are located the vertical side pocket members 109 and 110 which have the inturned edges 111 and 112 forming the pocket edges 113 and 114.

The bars 109 and 110 are slotted, as indicated at 115 and 116, 115a and 116a, and 115b and 116b.

In Fig. 6, the one piece metal or integrally molded plastic straight edge slider C¹, has the straight edge member 125 with the contact projections 126 which leaves a recess 127 for the 54 of slot locator B. The sides 128 will grip the sides of section 50 of the board A, while the inturned edges 129 will go under the board A.

The upturned edges 130 will fit into the slots 106 and 107. The pocket slider D may be integrally formed or molded in the same manner.

In Fig. 7, the laterally sliding slot locator B¹ is also shown as formed of one piece of metal or plastic. The central member 135 has a pusher stud 136 and the 45° arms 137 and 138 extending respectively upwardly and downwardly. The ridge 139 fits into and slides in the slot 53 between the sections 50 and 51 of the board A.

The pocket slider D is designed to receive a plurality of alternative wiring diagrams and wiring adaptors, which form no part of this invention and which merely consist of rectangular, elongated, plastic strips which enable the user of the calculator to obtain the various speed connections, group connections, as for example where series star whole coil adjacent type lap wound connections or odd coil groupings or consequent pole connections are to be calculated. These strips, however, form no part of the present invention and are not shown or described.

The slots 115, 115a, 115b, 116, 116a, 116b may be used to receive elongated strips graduated to assist in calculation of wound rotors or armatures in alternating current motors, but these strips do not form part of the present invention and are not shown or described. Such strips are only necessary where it is desired to calculate wave wound direct current problems, two element wave windings, and so forth.

In operation, the upper and lower sliders C and D are normally moved upwardly and downwardly so that they will be on the proper span lines. For example, the bottom edge of the slider C is moved down so that it will be just above one of the span lines counting upward from the central slot 53.

Then the top edge 252 of the pocket slider unit D is moved up also until just below a corresponding span line counting down from the slot 53.

Then the extreme left edge 254 of the motor slot locator B is moved to the left until it is midway between the calculator slots. With this arrangement the winding can then be calculated and it is possible to calculate an entire group of star or delta connections, series or parallel connections, whole coil or half coil connections, consequent or alternate pole connections and also direct current or lap wound connections.

To enable the setting of the sliders B, C and D, the following calculation may be given by way of example.

(a) series star whole coil connections, lap wound;
(b) twenty-four slots or coils;
(c) 4 pole;
(d) 3 phase.

The voltage will control the size and turns per coil in each phase of winding, but need not be taken into consideration in this problem. The current and wattage also do not affect the problem.

From factors (a) to (d) it is first necessary to calculate the following additional factors before the calculator may be used. These calculations may form factors (b), (c) and (d) and are the following:

(e) the span;
(f) the coils per group;

unless factors (e) and (f) are already given, which would be most unusual in commercial practice.

Where (e) and (f) must be calculated, the span is calculated as follows:

The span which may also be termed pitch in winding spaces is calculated on the basis of total number of slots times the winding spaces per slot divided by number of poles. With whole coils there are two coils per slot and two winding spaces per slot. With half coils there is one coil per slot and one winding space per slot.

Applying this to the present problem the total number of slots is 24, the winding spaces are two and the poles are 4 and the calculated result is 12.

To use the calculator we can add one or subtract one from 12 to give an odd number in winding spaces. This will give 11 or 13. Then the first winding space is added which will give twelve or fourteen winding spaces. Since there are two winding spaces per slot, this must be divided by two and the answer is 6 or 7. This means the span in slots will be either 1 to 6 or 1 to 7.

Since the spans 1 to 6 and 1 to 7 give almost the same output, but 1 to 7 uses much more copper than 1 to 6, it is usually preferable to use the shorter span 1 to 6 which will also give a mechanically stronger winding. Actually 1 to 6 is little less than 180 electrical degrees where 1 to 7 is the full 180 electrical degrees which is full pitch. For example, 1 to 6 may represent about 150 electrical degrees which gives a little less output but compensates in the saving of copper.

It may be emphasized at this point that all coil beginnings on chart A trace in a left to right movement, and all coils ends trace on the chart A in a right to left movement, for 3 spaces.

The coils per groups are found by dividing the slots or coils (in this case 24) by poles (in this case 4) times the phases (in this case 3) to obtain a figure of 2 coils per group.

Now the calculator is set. The bottom edge of straight edge C is set on the upper span lines 251 so that the lower edge 250 will just be above the sixth span line counting upwardly from the horizontal central slot 53. This slot will be numbered 6.

Then the top edge 252 of the pocket unit D is moved until it is just below the sixth span line 253 counting down from the slot 53 which span line will be numbered 6. Then the extreme left edge 254 of the motor slot locator B is moved to the left until it is midway between slots 255 which are numbered 24 and 25 counting from the left of the board. The slots 255 are shown adjacent the middle of the board A are every second space between the vertical lines receiving a number.

After this is done the connections may be readily traced.

With single phase, whole coil windings, the pocket slider D with wide diagram strips E' to $B^{12}$ together with shields $H^2$ to $H^5$ are used to show coil group connections only.

With repulsion type motors having one winding on the stator the circuit beginnings of Fig. 1, IS is used only.

With split phase motors having a starting and running winding circuit, beginnings IS and 2S of Fig. 1 are used only.

With the narrow diagram strips F and the wide diagram strips E the spacing and direction of the circuit lines may be widely varied, depending upon the particular problem presented with varying numbers of poles and slots for one, two and three phase connections.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. An electric dynamo winding calculator comprising a circuit chart, said chart having a plurality of arrow-shaped outlines showing circuit connections, two sliders at opposite sides of said circuit chart to fix the span lines, a transversely moving slider to fix the slots said transversely moving slider taking the form of an arrow-head slot locator to cooperate with said arrow-shaped outlines, one of said first mentioned sliders and said transversely moving slider carrying the designation of the coil ends.

2. An electric dynamo winding calculator comprising a circuit chart, said chart having a plurality of arrow-shaped outlines showing circuit connections, two sliders at opposite sides of said circuit chart to fix the span lines, a transversely moving slider to fix the slots said transversely moving slider taking the form of an arrow-head slot locator to cooperate with said arrow-shaped outlines, one of said first mentioned sliders and said transversely moving slider carrying the designation of the coil ends, said transversely moving slider being positioned to move between the chart and the first two sliders.

3. An electric dynamo winding calculator comprising a circuit chart, said chart having a plurality of arrow-shaped outlines showing circuit connections, two sliders at opposite sides of said circuit chart to fix the span lines, a transversely moving slider to fix the slots said transversely moving slider taking the form of an arrow-head slot locator to cooperate with said arrow-shaped outlines, said first mentioned sliders and said transversely moving slider carrying the designation of the coil ends, one of said first mentioned sliders carrying supplemental charts to show the connections between the coil ends.

4. An electric dynamo winding calculator comprising a circuit chart, said chart having a plurality of arrow-shaped outlines showing circuit connections, two sliders at opposite sides of said circuit chart to fix the span lines, a transversely moving slider to fix the slots said transversely moving slider taking the form of an arrow-head slot locator to cooperate with said arrow-shaped outlines, said first mentioned sliders and said transversely moving slider carrying the designation of the coil ends, and a supplemental chart carried by one of said first mentioned sliders to show the connections to commutator bars of a direct current dynamo.

5. An electric dynamo winding calculator comprising a circuit chart, said chart having a plurality of arrow-shaped outlines showing circuit connections, two sliders at opposite sides of said circuit chart to fix the span lines, a transversely moving slider to fix the slots said transversely moving slider taking the form of an arrow-head slot locator to cooperate with said arrow-shaped outlines, said first mentioned sliders and said transversely moving slider carrying the designation of the coil ends, and a supplemental chart carried by one of said first mentioned sliders to show the connections of alternating current dynamo to the feed lines.

6. An electric dynamo winding calculator comprising a circuit chart, said chart having a plurality of arrow-shaped outlines showing circuit connections, two sliders at opposite sides of said circuit chart to fix the span lines, a transversely moving slider to fix the slots said transversely moving slider taking the form of an arrow-head slot locator to cooperate with said arrow-shaped outlines, said first mentioned sliders and said transversely moving slider carrying the designation of the coil ends, and a supplemental chart carried by one of said first mentioned sliders to show the connections of the alternating current dynamo to a third phase star connection.

7. An electric dynamo winding calculator comprising a centrally laterally slotted folding board carrying upper and lower groups of circuit lines with coil ends of each side of said groups of said circuit lines and with dynamo slot lines extending across said slot, a straight edge sliding vertically across said upper group and a pocket slider sliding vertically across said lower group of circuit lines and a laterally moving arrow head slot locator sliding laterally across said groups of circuit lines, said circuit lines forming arrow-shaped outlines and said arrow-head slot locator cooperating with said outlines.

8. A circuit calculator for winding dynamos comprising a chart showing coil beginnings and ends, and a diagram strip to be placed thereon to indicate the circuit connections between the coil beginnings and ends, and an adapter to show the connections between the diagram strip and the coil beginnings and ends, and a transparent shield positioned on the diagram strip to alter to circuit connections on the diagram strip from a star connection to a delta connection.

9. A circuit calculator for winding dynamos comprising a chart showing coil beginnings and ends, and a diagram strip to be placed thereon to indicate the circuit connections between the coil beginnings and ends, and an adapter to show the connections between the diagram strip and the coil beginnings and ends, and an opaque shield positioned on the diagram strip to indicate the circuit connections in accordance with the number of poles.

10. An electric dynamo winding calculator comprising a flat diagram plate showing the developed circuits through the dynamo slots, the span and coil ends; a transversely sliding member on one side to locate the correct span line on one side of the diagram plate; a second transversely sliding member on the other side to locate the correct span line on the other side of the diagram plate and also carrying the coil beginnings and coil ends; wide diagram strips carrying the external circuit connections between the coils positioned upon and carried by the second sliding member; narrow adapter strips carrying circuit connections between the circuit connections of the wide diagram strips and the coil beginnings and ends on the second sliding member, said narrow adapter strips being positioned on and carried by the second sliding member above the wide diagram strips; transparent shields positioned on the wide diagram strips to terminate and alter the circuit on the wide diagram strips; an opaque shield positioned on the wide diagram strip to alter and complete the circuit on the wide diagram strips; and a laterally moving locator to locate correct number of motor slots and to give the coil ends of a developed diagram.

11. An electric dynamo winding calculator comprising a flat diagram plate showing the developed circuits through the dynamo slots, the span and coil ends; a transversely sliding member on one side to locate the correct span line on one side of the diagram plate; a second transversely sliding member on the other side to locate the correct span line on the other side of the diagram plate and also carrying the coil beginnings and coil ends; wide diagram strips carrying the external circuit connections between the coils positioned upon and carried by the second sliding member; narrow adapter strips carrying circuit connections between the circuit connections of the wide diagram strips and the coil beginnings and ends on the second sliding member, said narrow adapter strips being positioned on and carried by the second sliding member above the wide diagram strips, and a laterally moving locator to locate correct number of motor slots and to give the coil ends of a developed diagram.

12. An electric dynamo winding calculator comprising a flat diagram plate showing the developed circuits through the dynamo slots, the span and coil ends; a transversely sliding member on one side to locate the correct span line on one side of the diagram plate; a second transversely sliding member on the other side to locate the correct span line on the other side of the diagram plate and also carrying the coil beginnings and coil ends; wide diagram strips carrying the external circuit connections between the coils positioned upon and carried by the second sliding member; and a laterally moving locator to locate correct number of motor slots and to give the coil ends of a developed diagram.

EDWARD C. GISIN.

REFERENCES CITED

The following references are of record in the file of this patent:

UNITED STATES PATENTS

| Number | Name | Date |
|---|---|---|
| 625,005 | Wilkinson | May 16, 1899 |
| 1,186,146 | Sutherland et al. | June 6, 1916 |
| 1,545,921 | Paul | July 14, 1925 |

FOREIGN PATENTS

| Number | Country | Date |
|---|---|---|
| 27,683 | Great Britain | Dec. 5, 1906 |
| 577,096 | France | Feb. 12, 1924 |